(12) United States Patent
Yang et al.

(10) Patent No.: US 9,182,993 B2
(45) Date of Patent: Nov. 10, 2015

(54) DATA AND PHASE LOCKING BUFFER DESIGN IN A TWO-WAY HANDSHAKE SYSTEM

(75) Inventors: Genkun Jason Yang, Sarasota, CA (US); Ramkumar Prakasam, Santa Clara, CA (US)

(73) Assignee: BROADCOM CORPORATION, Irvine, CA (US)

( * ) Notice: Subject to any disclaimer, the term of this patent is extended or adjusted under 35 U.S.C. 154(b) by 3389 days.

(21) Appl. No.: 11/140,833

(22) Filed: May 31, 2005

(65) Prior Publication Data

US 2006/0268992 A1 Nov. 30, 2006

(51) Int. Cl.
*G06F 9/38* (2006.01)
*H04N 19/42* (2014.01)
*H04N 19/86* (2014.01)

(52) U.S. Cl.
CPC .............. *G06F 9/3869* (2013.01); *H04N 19/42* (2014.11); *H04N 19/86* (2014.11)

(58) Field of Classification Search
USPC .......... 375/240.28; 712/219, 223; 711/2, 118; 709/231
See application file for complete search history.

(56) References Cited

U.S. PATENT DOCUMENTS

| | | | |
|---|---|---|---|
| 5,060,186 A * | 10/1991 | Barbagelata et al. | 711/2 |
| 6,279,077 B1 * | 8/2001 | Nasserbakht et al. | 711/118 |
| 6,282,637 B1 * | 8/2001 | Chan et al. | 712/223 |
| 7,058,793 B1 * | 6/2006 | Hartnett et al. | 712/219 |
| 7,103,668 B1 * | 9/2006 | Corley et al. | 709/231 |

* cited by examiner

*Primary Examiner* — Gims Philippe
(74) *Attorney, Agent, or Firm* — Foley & Lardner LLP (57) ABSTRACT

A data and phase locking buffer design in a two-way handshake system is provided and may comprise sequentially locking pipelining of data in a synchronized pipeline and draining the synchronized pipeline of the data. The data may be synchronously accepted at a substantially similar time by contiguous pipeline stages that have data to be accepted. A ready signal, which may be processed after being generated by a present pipeline stage of the synchronized pipeline, may be communicated to a subsequent pipeline stage of the synchronized pipeline. An accept signal may be communicated from a present pipeline stage to a previous pipeline stage. A drain signal may be generated for draining the data from the synchronized pipeline. The drain signal may be asserted and deasserted based on end of line information in the data.

20 Claims, 10 Drawing Sheets

DATA AND PHASE LOCKING BUFFER DESIGN IN A TWO-WAY HANDSHAKE SYSTEM

CROSS-REFERENCE TO RELATED APPLICATIONS/INCORPORATION BY REFERENCE

This application makes reference to:
U.S. patent application Ser. No. 11/083,597 filed Mar. 18, 2005;
U.S. patent application Ser. No. 11/087,491 filed Mar. 22, 2005;
U.S. patent application Ser. No. 11/090,642 filed Mar. 25, 2005;
U.S. patent application Ser. No. 11/089,788 filed Mar. 25, 2005; and
U.S. patent application Ser. No. 11/140,824 filed May 31, 2005.

The above stated applications are hereby incorporated herein by reference in their entirety.

FIELD OF THE INVENTION

Certain embodiments of the invention relate to accessing data. More specifically, certain embodiments of the invention relate to data and phase locking buffer design in a two-way handshake system.

BACKGROUND OF THE INVENTION

Advances in compression techniques for audio-visual information have resulted in cost effective and widespread recording, storage, and/or transfer of movies, video, and/or music content over a wide range of media. The Moving Picture Experts Group (MPEG) family of standards is among the most commonly used digital compressed formats. A major advantage of MPEG compared to other video and audio coding formats is that MPEG-generated files tend to be much smaller for the same quality. This is because MPEG uses sophisticated compression techniques. However, MPEG compression may be lossy and, in some instances, it may distort the video content. In this regard, the more the video is compressed, that is, the higher the compression ratio, the less the reconstructed video retains the original information. Some examples of MPEG video distortion are loss of textures, details, and/or edges. MPEG compression may also result in ringing on sharper edges and/or discontinuities on block edges. Because MPEG compression techniques are based on defining blocks of video image samples for processing, MPEG compression may also result in visible "macroblocking" that may result due to bit errors. In MPEG, a macroblock is an area covered by a 16×16 array of luma samples in a video image. Luma may refer to a component of the video image that represents brightness. Moreover, noise due to quantization operations, as well as aliasing and/or temporal effects may all result from the use of MPEG compression operations.

When MPEG video compression results in loss of detail in the video image it is said to "blur" the video image. In this regard, operations that are utilized to reduce compression-based blur are generally called image enhancement operations. When MPEG video compression results in added distortion on the video image it is said to produce "artifacts" on the video image. For example, the term "mosquito noise" may refer to MPEG artifacts that may be caused by the quantization of high spatial frequency components in the image. In another example, the term "block noise" may refer to MPEG artifacts that may be caused by the quantization of low spatial frequency information in the image. Block noise may appear as edges on 8×8 blocks and may give the appearance of a mosaic or tiling pattern on the video image.

There may be some systems that attempt to remove video noise. However, the systems may comprise a data buffer for each of the clients that may be processing the video data. The redundancy of the video buffers may be expensive in terms of chip layout area and power consumed. The various clients may produce processed video data that may be used by other clients and/or combined to create a single output. In order to blend the video data, all of the various video data must be synchronized. Decentralized synchronization may be complex and require much coordination. As the video processing systems get larger, the problems related with chip layout area, power required, and synchronization of the various video streams may be exacerbated.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for data and phase locking buffer design in a two-way handshake system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for data and phase locking buffer design in a two-way handshake system. Various aspects of the invention may be utilized to control transfer of data in a pipeline. Aspects of the invention may comprise sequentially locking pipelining of data in a synchronized pipeline and draining the synchronized pipeline of the data. The data may be synchronously accepted at a substantially similar time by contiguous pipeline stages that have data to be accepted. A ready signal generated by a present pipeline stage of the synchronized pipeline may be communicated to a subsequent pipeline stage of the synchronized pipeline. The generated ready signal may be processed before communicating the processed ready signal to a subsequent pipeline stage. An accept signal may be communicated from a present pipeline stage to a previous pipeline stage.

A drain signal may be generated, which may be utilized to drain the data from the synchronized pipeline. The drain signal may be asserted and deasserted based on end of line information contained in the data. The method may further comprise communicating data in the synchronized pipeline for processing to a plurality of data processing units. The data processed by the data processing units and unprocessed data in the synchronized pipeline may be blended utilizing phase information in the data.

Figure 1:
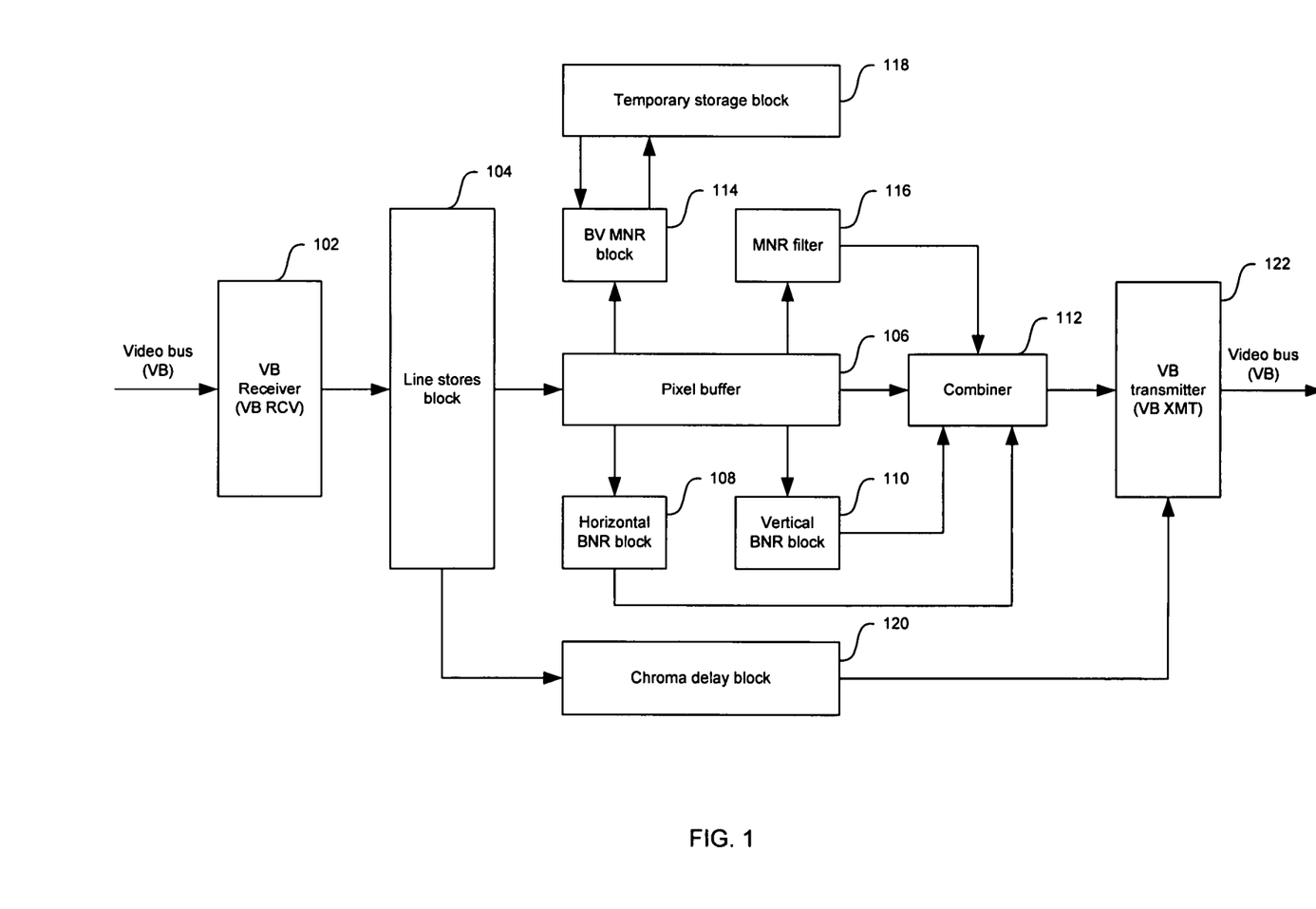
FIG. 1 is a block diagram of an exemplary top-level partitioning of a digital noise reduction block.

FIG. 1 is a block diagram of an exemplary top-level partitioning of a digital noise reduction block. Referring to FIG. 1, the digital noise reduction block may comprise a video bus receiver (VB RCV) 102, a line stores block 104, a pixel buffer 106, a combiner 112, a horizontal block noise reduction (BNR) block 108, a vertical BNR block 110, a block variance (BV) mosquito noise reduction (MNR) block 114, an MNR filter 116, a temporary storage block 118, and a chroma delay block 120, and a VB transmitter (VB XMT) 122.

The VB RCV 102 may comprise suitable logic, circuitry, and/or code that may be adapted to receive MPEG-coded images in a format that is in accordance with the bus protocol supported by the video bus (VB). The VB RCV 102 may also be adapted to convert the received MPEG-coded video images into a different format for transfer to the line stores block 104. The line stores block 104 may comprise suitable logic, circuitry, and/or code that may be adapted to convert raster-scanned luma data from a current MPEG-coded video image into parallel lines of luma data. The line stores block 104 may be adapted to operate in a high definition (HD) mode or in a standard definition (SD) mode. Moreover, the line stores block 104 may also be adapted to convert and delay-match the raster-scanned chroma information into a single parallel line. The pixel buffer 106 may comprise suitable logic, circuitry, and/or code that may be adapted to store luma information corresponding to a plurality of pixels from the parallel lines of luma data generated by the line stores block 104. For example, the pixel buffer 106 may be implemented as a shift register. The pixel buffer 106 may be common to the MNR block 114, the MNR filter 116, the horizontal BNR block 108, and the vertical BNR block 110 to reduce, for example, chip layout area.

The BV MNR block 114 may comprise suitable logic, circuitry, and/or code that may be adapted to determine a block variance parameter for image blocks of the current video image. The BV MNR block 114 may utilize luma information from the pixel buffer 106 and/or other processing parameters. The temporary storage block 118 may comprise suitable logic, circuitry, and/or code that may be adapted to store temporary values determined by the BV MNR block 114. The MNR filter 116 may comprise suitable logic, circuitry, and/or code that may be adapted to determined a local variance parameter based on a portion of the image block being processed and to filter the portion of the image block being processed in accordance with the local variance parameter. The MNR filter 116 may also be adapted to determine a MNR difference parameter that may be utilized to reduce mosquito noise artifacts.

The HBNR block 108 may comprise suitable logic, circuitry, and/or code that may be adapted to determine a horizontal block noise reduction difference parameter for a current horizontal edge. The VBNR block 110 may comprise suitable logic, circuitry, and/or code that may be adapted to determine a vertical block noise reduction difference parameter for a current vertical edge.

The combiner 112 may comprise suitable logic, circuitry, and/or code that may be adapted to combine the original luma value of an image block pixel from the pixel buffer 106 with a luma value that results from the filtering operation performed by the MNR filter 116. The chroma delay 120 may comprise suitable logic, circuitry, and/or code that may be adapted to delay the transfer of chroma pixel information in the chroma data line to the VB XMT 122 to substantially match the time at which the luma data generated by the combiner 112 is transferred to the VB XMT 122. The VB XMT 122 may comprise suitable logic, circuitry, and/or code that may be adapted to assemble noise-reduced MPEG-coded video images into a format that is in accordance with the bus protocol supported by the VB.

Figure 2:
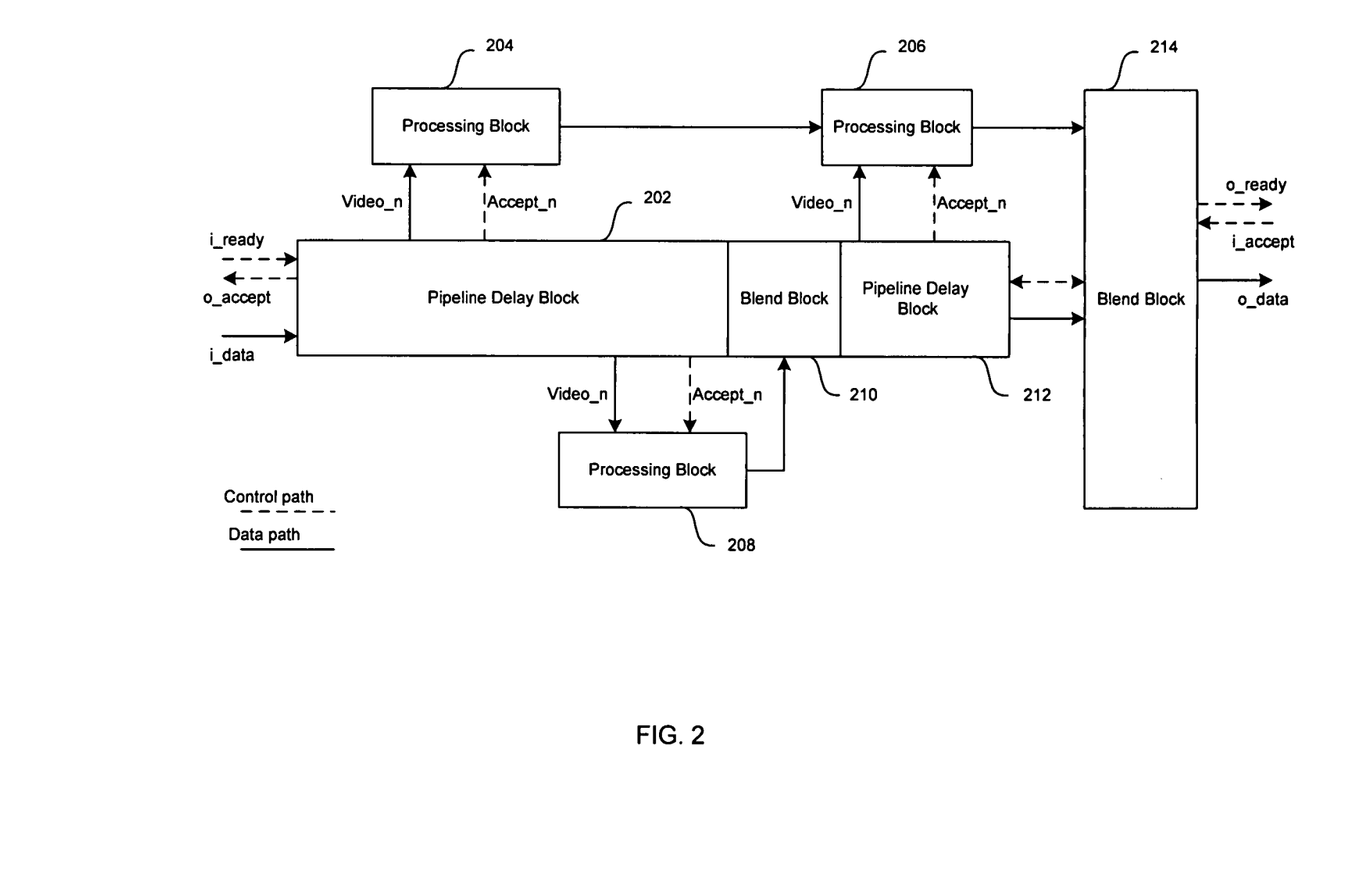
FIG. 2 is a block diagram illustrating an exemplary configuration in use for a portion of a digital noise reduction block with shared data buffer and synchronized control, in accordance with an embodiment of the invention.

FIG. 2 is a block diagram illustrating an exemplary configuration in use for a portion of a digital noise reduction block with shared data buffer and synchronized control, in accordance with an embodiment of the invention. Referring to FIG. 2, there is shown pipeline delay blocks 202 and 212, processing blocks 204, 206, and 208, and blend blocks 210 and 214. The pipeline delay blocks 202 and 212 may comprise suitable logic, circuitry, and/or code that may be adapted to synchronously delay video data in order that the various video data may be correctly aligned with each other. The pipeline delay blocks 202 and 212 may be similar to the pixel buffer 106 or the chroma delay block 120 (FIG. 1). The processing blocks may also be referred to as data processing units.

The processing blocks 204, 206, and 208 may comprise suitable logic, circuitry, and/or code that may be adapted to process video data, and output the processed video data with appropriate delay in a synchronous manner. The processing block 204, 206, or 208 may be, for example, similar to the BV MNR block 114, the horizontal BNR block 108, or the vertical BNR block 110 (FIG. 1). The blend blocks 210 and 214 may comprise suitable logic, circuitry, and/or code that may be adapted to receive various inputs of video data and combine the various received video data into one stream of video data. For example, the blend block 208 may blend video data from the processing block 208 and from the pipeline delay block 202 to provide video data to the pipeline delay block 212. In this respect, the blend blocks 210 and 214 may be similar to the combiner 112 and/or VB transmitter 122 (FIG. 1). There is also shown an input ready signal i_ready, an output ready signal o_ready, an input accept signal i_accept, an output accept signal o_accept, an input data signal i_data, and an output data signal o_data. Furthermore, a plurality of pixel accept signals referred to as accept_n and a plurality of video signals referred to as video_n may be communicated to each of the processing blocks 204, 206, and 212, from the pipeline delay blocks 202 and 212.

The plurality of video signals video_n may comprise pixels of video data at different positions in the pipeline delay blocks. For example, the processing block 204 may process pixels at positions 5 and 13 in a horizontal line of video. In this regard, the pixels at positions 5 and 13 may comprise the video signals video_n. Similarly, the plurality of pixel accept signals accept_n may correlate to the pixels in the video signals video_n. If the video signals comprise pixels at positions 5 and 13, the plurality of pixel accept signals accept_n may correspond to the pixels at positions 5 and 13. When a pixel accept signal is asserted, the corresponding pixel may be accepted as a valid pixel.

The various blocks, for example, the pipeline delay block 202 and the blend block 214, may utilize ready-accept handshaking to transfer data. For example, the pipeline delay block 202 may assert a ready signal to the blend block 214 when it has data that can be transmitted to the blend block 214. The blend block 214 may have an accept signal deasserted until it is ready to process the new data. The blend block 214 may then assert the accept signal to the pipeline delay block 202 when it has accepted the new data. When the pipeline delay block 202 receives the asserted accept signal from the blend block 214, it may keep the ready signal asserted if it has new data to send. Otherwise, it may deassert the ready signal until it has new data to send to the blend block 214. In this manner, by asserting and deasserting the ready signal and the accept signal, the pipeline delay block 202 may communicate data to the blend block 214.

In this regard, the input ready signal i_ready and the output accept signal o_accept may be asserted and/or deasserted in order to control the flow of video data, via the input data signal i_data, into the pipeline delay block 202. The video data may be accepted by the pipeline delay block 202, and the video data may be shifted synchronously. The plurality of video signals video_n may be communicated to the processing blocks 204, 206, and 208. Additionally, the pixel accept signals accept_n may also be communicated to the processing blocks 204, 206, and 208. When the appropriate pixel accept signal is asserted, the processing block may accept the associated pixel. This will be explained further with respect to FIG. 7.

In operation, the pipeline delay block 202 may accept data and shift the data synchronously. Appropriate accept signals may be asserted to the processing unit 204. The processing unit 204 may process the appropriate pixels and communicate the output to the processing unit 206. The pipeline delay block 202 may communicate the appropriate pixel accept signals to the processing block 208. The processing block 208 may process the pixels and communicate the output to the blend block 210. The blend block 210 may blend the video output of the processing block 208 with the video output communicated by the pipeline delay block 202. The resulting video output may be communicated to the pipeline delay block 212.

Appropriate pixel accept signals corresponding to the desired pixel positions in the pipeline delay block 212 may be communicated to the processing unit 206. The processing unit 206 may process the video and communicate the processed output to the blend block 214. The pipeline delay block 212 may utilize ready-accept handshaking to communicate its output to the blend block 214. The blend block 214 may blend the video data communicated by the processing block 206 and the pipeline delay block 212 to generate an output video signal o_data. The various blocks may operate synchronously by utilizing a pre-determined clock signal or clock signals.

Figure 3:
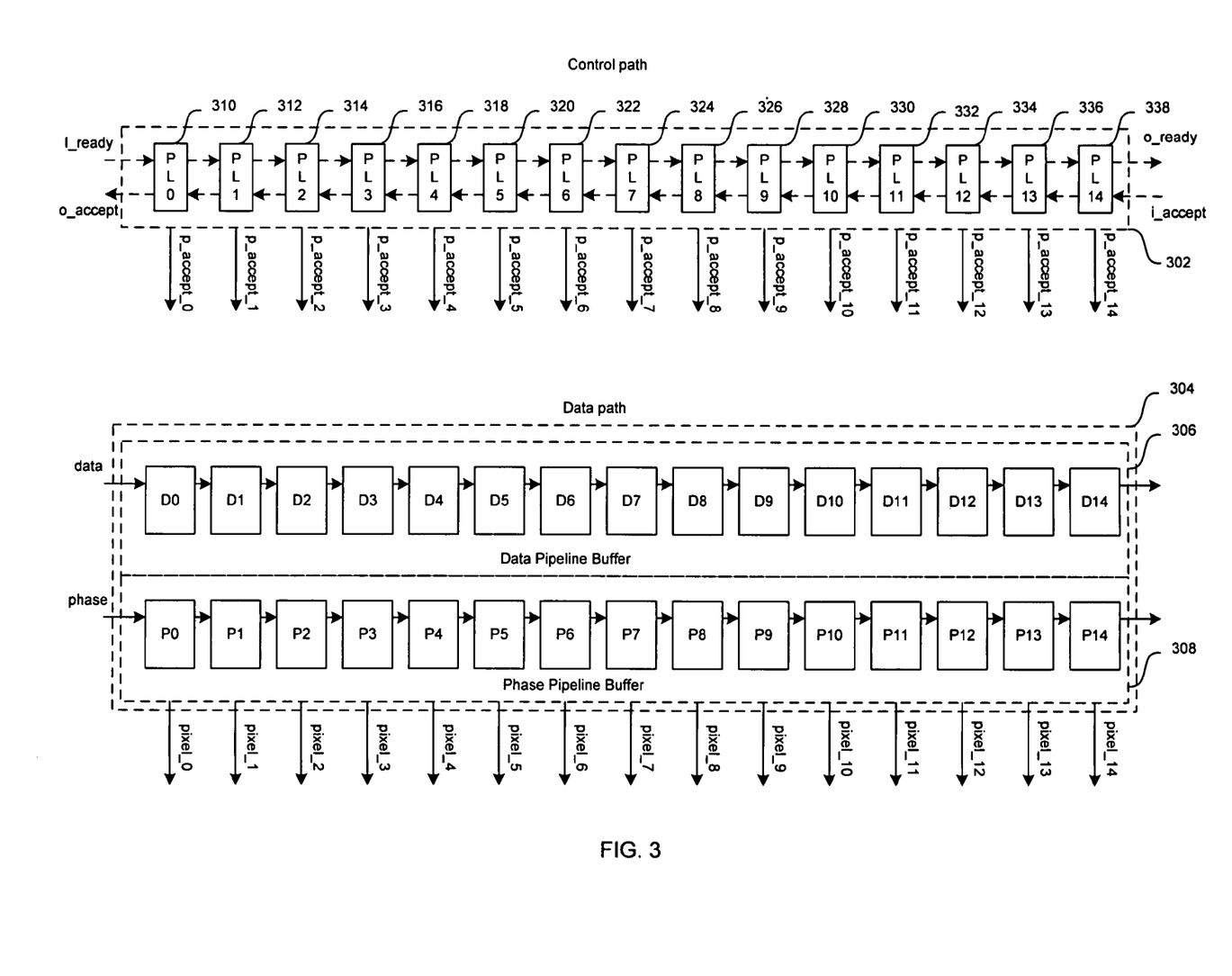
FIG. 3 is a block diagram illustrating an exemplary unlocked centralized reference control with common data buffer, in connection with an embodiment of the invention.

FIG. 3 is a block diagram illustrating an exemplary centralized reference control with common data buffer, in connection with an embodiment of the invention. Referring to FIG. 3, there is shown a control pipeline 302 and a shared buffer 304. The control pipeline 302 may comprise a plurality of pipeline stages 310, 312, ..., 338. Each of the pipeline stages 310, 312, ..., 338 may comprise suitable logic, circuitry and/or code that may be adapted to control flow of data in the shared buffer 304. The shared buffer 304 may comprise a data pipeline buffer 306 and a phase pipeline buffer 308. The data pipeline buffer 306 may store luma and chroma pixels for the corresponding pipeline stages 310, 312, ... 338. The phase pipeline buffer 308 may store phase information for the corresponding pixels for the pipeline stages 310, 312, ..., 338. Although a clock signal is not shown, the pipeline stages in the control path and the data path may be clocked by at least one clock signal in order to operate synchronously. The use of the clock signal will be described with respect to FIG. 4.

A present pipeline stage may communicate to a subsequent pipeline stage a ready signal that may be asserted to indicate that new data may be available for the subsequent pipeline stage. The subsequent pipeline stage may communicate to the present pipeline stage an accept signal that may be asserted to indicate that it has accepted the new data. In this manner, each of the pipeline stages 310, 312, ..., 338 in the control pipeline 302 may communicate via the ready-accept handshaking signals with a previous pipeline stage and a subsequent pipeline stage to control the flow of data in the shared buffer 304. For example, the pipeline stage 316 may communicate an asserted ready signal to the subsequent pipeline stage 318 when it has accepted pixel and related phase information in the data pipeline buffer 306 and the phase pipeline buffer 308, respectively, from the previous pipeline stage 314.

The subsequent pipeline stage 318 may accept the pixel and phase information from the pipeline stage 316 and may communicate an asserted accept signal to indicate to the present pipeline stage that the pixel and phase information has been accepted. Accordingly, a pipeline stage may accept new data when it is provided by the previous pipeline stage and when it is ready to accept the new data.

There is also shown a plurality of pixel accept signals p_accept_0 ... p_accept_14 and a plurality of corresponding pixels pixel_0 ... pixel_14. All, or a subset, of these pixel accept signals may be communicated to a processing block, for example, the processing block 208 (FIG. 2). The pixel accept signal, when asserted, may indicate to the processing block that the appropriate pixel and/or phase information may be accepted. The pixel accept signals at each pipeline stage, for example, the pixel accept signal p_accept_3 for the pipeline stage 316, may be generated similarly as the accept signal for that stage. For example, the conditions that lead to assertion of the accept signal communicated to the pipeline stage 314 may also lead to assertion of the pixel accept signal p_accept_3.

Figure 4:
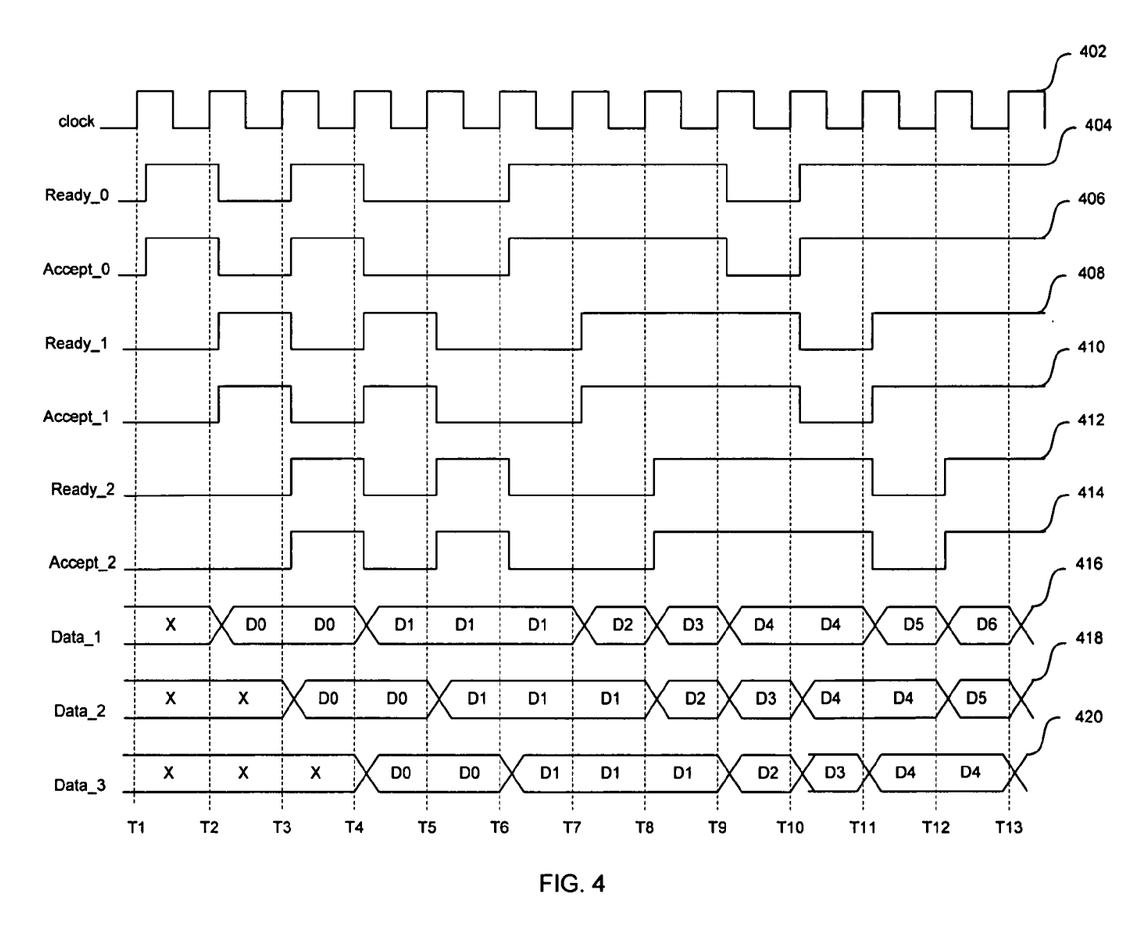
FIG. 4 is a timing diagram of an unlocked centralized reference control with common data buffer, in connection with an embodiment of the invention.

FIG. 4 is a timing diagram of an unlocked centralized reference control with common data buffer, in connection with an embodiment of the invention. Referring to FIG. 4, there is shown a clock signal 402, ready signals 404, 408, and 412, accept signals 406, 410, and 414, and data signals 416, 418, and 420. The ready signals 404, 408 and 412 and the data signals 416, 418, and 420 may be synchronously generated by the rising edge of the clock signal 402. The rising edges of the clock signal 402 are indicated by time instants T1 ... T13. The accept signals 406, 410, and 414 may be outputs of combinational logic circuits.

This timing diagram illustrates data transfer in the first four pipeline stages, for example, the pipeline stages 310, 312, 314, and 316 (FIG. 3). The pipeline stages 310, 312, 314, and 316 may each have two inputs, an input ready signal and an input accept signal, and two outputs, an output ready signal and an output accept signal. Therefore, the output ready signals of the pipeline stages 310, 312, and 314 (ready signals 404, 408, and 412) may be the input ready signals of the pipeline stages 312, 314, and 316. Similarly, the output accept signals of the pipeline stages 312, 314, and 316 (accept signals 406, 410, and 414) may be the input accept signals of the pipeline stages 310, 312, and 314, respectively.

The outputs may be generated at each pipeline stage 310, 312, 314, and 316 according to the following equations:

```
ready_out := ( (NOT(ready_out)) AND (ready_in) )
    OR ( (ready_out) AND (ready_in) AND (accept_in) )
    OR ( (ready_out) and (NOT(accept_in)) )
accept_out = ( (NOT(ready_out)) AND (ready_in) )
    OR ( (ready_out) AND (ready_in) AND (accept_in) ).
```

The term ready_out may be the output ready signal, for example, the ready signal 404, 408, or 412, and the term accept_out may be the output accept signal, for example, the accept signal 414, 410, or 406. The term ready_in may be the input ready signal, for example, the ready signal 404, 408, or 412, and the term accept_in may be the input accept signal, for example, the accept signal 414, 410, or 406.

In operation, the pipeline stage 310 may assert the ready signal 404 at time instant T1 to indicate to the pipeline stage 312 that it may have new data D0. In response, the pipeline stage 312 may assert the accept signal 406, and the data D0 from the pipeline stage 310 may be stored in the pipeline stage 312 at time instant T2. Also at time instant T2, the ready signal 404 and the accept signal 406 may be deasserted. Additionally, the pipeline stage 312 may assert the ready signal 408 to indicate to the pipeline stage 314 that it may have new data D0. In response, the pipeline stage 314 may assert the accept signal 410, and may accept the data D0 from the pipeline stage 312 at time instant T3. At time instant T3, the ready signal 408 and the accept signal 410 may be deasserted.

The pipeline stage 310 may receive new data D1 and may assert the ready signal 404 at time instant T3. Similarly, the pipeline stage 314 may assert the ready signal 412 at time instant T3 to indicate to the pipeline stage 316 that it has new data D0. The pipeline stages 312 and 316 may respond by asserting the accept signals 406 and 414, respectively. At time instant T4, the pipeline stages 312 and 316 may accept the data D1 and D0, respectively, from the pipeline stages 310 and 314, respectively. Also at time instant T4, the pipeline stages 310, 312, 314, and 316 may deassert the ready signal 404, the accept signal 406, the ready signal 412, and the accept signal 414, respectively. The pipeline stage 312 may additionally assert the ready signal 408 at time instant T4 to indicate that it has data D0. The pipeline stage 314 may respond by asserting the accept signal 410.

At time instant T5, the pipeline stage 314 may accept the data D1 from the pipeline stage 312. The pipeline stages 312 and 314 may deassert the ready signal 408 and the accept signal 410, respectively, at time instant T5. Also, the pipeline stage 314 may assert the ready signal 412 and the pipeline stage 316 may respond by asserting the accept signal 414. At time instant T6, the pipeline stage 316 may accept the data D1. The pipeline stages 314 and 316 may also deassert the ready signal 412 and the accept signal 416, respectively. Also at time instant T6, the pipeline stage 310 may assert the ready signal 404, and the pipeline stage 312 may assert the accept signal 406. At time instant T9, the pipeline stage 310 may deassert the ready signal 404, and the pipeline stage 312 may respond by deasserting the accept signal 406. Since the pipeline stage 310 asserted the ready signal 404, and the pipeline stage 312 kept the accept signal 406 asserted, the pipeline stage 312 may accept data D2, D3, and D4 at time instants T7, T8 and T9, respectively.

At time instant T7, the pipeline stage 312 may assert the ready signal 408, and the pipeline stage 314 may assert the accept signal 410. At time instant T10, the pipeline stage 312 may deassert the ready signal 408, and the pipeline stage 314 may respond by deasserting the accept signal 410. Since the pipeline stage 312 asserted the ready signal 408, and the pipeline stage 314 kept the accept signal 410 asserted, the pipeline stage 314 may accept data D2, D3, and D4 at time instants T8, T9, and T10, respectively.

At time instant T8, the pipeline stage 314 may assert the ready signal 412, and the pipeline stage 316 may assert the accept signal 414. At time instant T11, the pipeline stage 314 may deassert the ready signal 412, and the pipeline stage 316 may respond by deasserting the accept signal 414. Since the pipeline stage 314 asserted the ready signal 412, and the pipeline stage 316 kept the accept signal 414 asserted, the pipeline stage 314 may accept data D2, D3, and D4 at time instants T9, T10, and T11, respectively.

At time instants T10, the pipeline stage 310 may assert the ready signal 404 and the pipeline stage 312 may assert the accept signal 406. The pipeline stage 312 may accept new data D5 and D6 at time instants T11 and T12. At time instant T11, the pipeline stage 312 may assert the ready signal 408 and the pipeline stage 314 may assert the accept signal 410. The pipeline stage 314 may accept new data D5 at time instant T12.

At time instant T8, when the pipeline stages 312, 314 and 316 are loaded with data D3, D2, and D1, respectively. At time T9, the data in each pipeline stage may have been loaded with new data D4, D3, and D2. However, at time T10, because the pipeline stage 310 did not have new data, the pipeline stage 312 did not load new data, while the pipeline stages 314 and 316 were able to load new data D4 and D3, respectively. Therefore, the pipeline stages 312, 314 and 316 no longer had sequential data, but instead had data D4, D4 and D3, respectively. At time instant T12, the pipeline stages 312, 314 and 315 caught up and had sequential data D6, D5 and D4.

Instances where data sequence is not locked sequentially for all clock periods may be problematic for some applications, for example, like data filtering which process multiple input data at a time. Accordingly, one embodiment of the invention may provide locking of sequential data as the data propagates through various pipeline stages.

Figure 5:
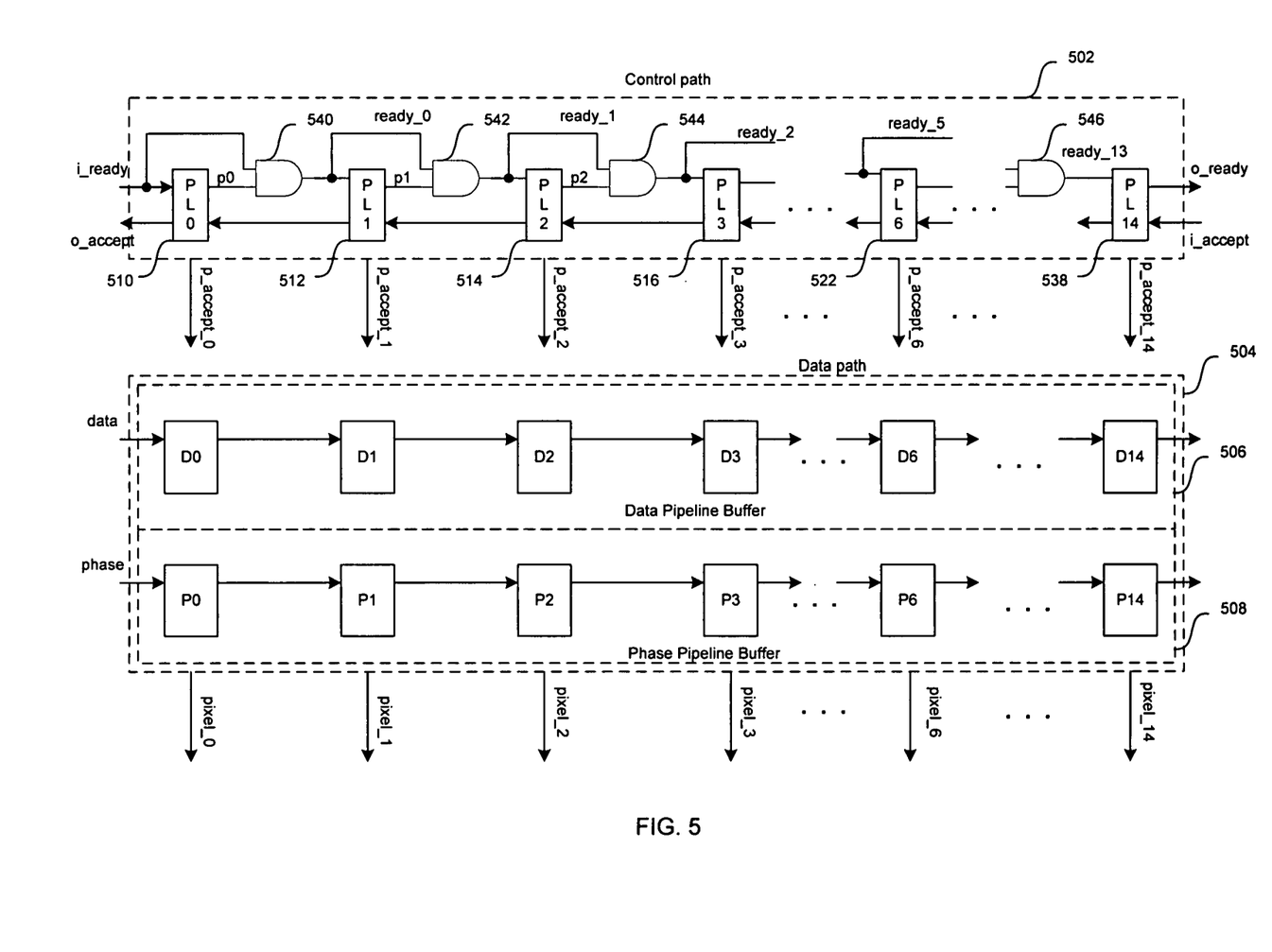
FIG. 5 is a block diagram illustrating an exemplary locked centralized reference control with common data buffer, in accordance with an embodiment of the invention.

FIG. 5 is a block diagram illustrating an exemplary locked centralized reference control with common data buffer, in accordance with an embodiment of the invention. FIG. 5 is similar to FIG. 3, however, a ready signal output from each pipeline stage, except from the final pipeline stage, for example, the pipeline stage 538, may be processed. The processing may be achieved utilizing, for example, combinational logic comprising components such as an AND gate. There is shown in FIG. 5 exemplary combinatorial logic comprising a plurality of AND gates 540, 542, 544, ..., 546. The processed ready signal may allow locking of sequential data in the pipeline stages, for example the pipeline stages 510 ... 538. Although a clock signal is not shown, the pipeline stages in the control path and the data path may be clocked by at least one clock signal in order to operate synchronously. The use of the clock signal is described with respect to FIG. 6.

The output of the combinational logic may be the ready signal that is communicated to the subsequent pipeline stage. For example, the input ready signal to the pipeline stage 514 may be the output of the AND gate 542. The inputs of the AND gate 542 may be the input ready signal to the pipeline stage 512 (ready_0) and the output ready signal of the pipeline stage 512 (p1). The output ready signal of the pipeline stage 512 (p1) may not be propagated to the ready input of the pipeline stage 514 until it is enabled by the ready signal ready_0. Since the pipeline stage 514 may not receive the ready signal, it may not assert its output accept signal. Therefore, the pipeline stage 512 may keep the ready signal p1 asserted. When the ready signal ready_0 is asserted, the ready_1 signal may be asserted to the pipeline stage 514, and ready/accept handshaking may occur. In this manner, the data in each pipeline stage may not change until all the pipeline stages that can accept data are able to accept data. Accordingly, the data in the synchronized pipeline stages may be sequentially locked.

Figure 6:
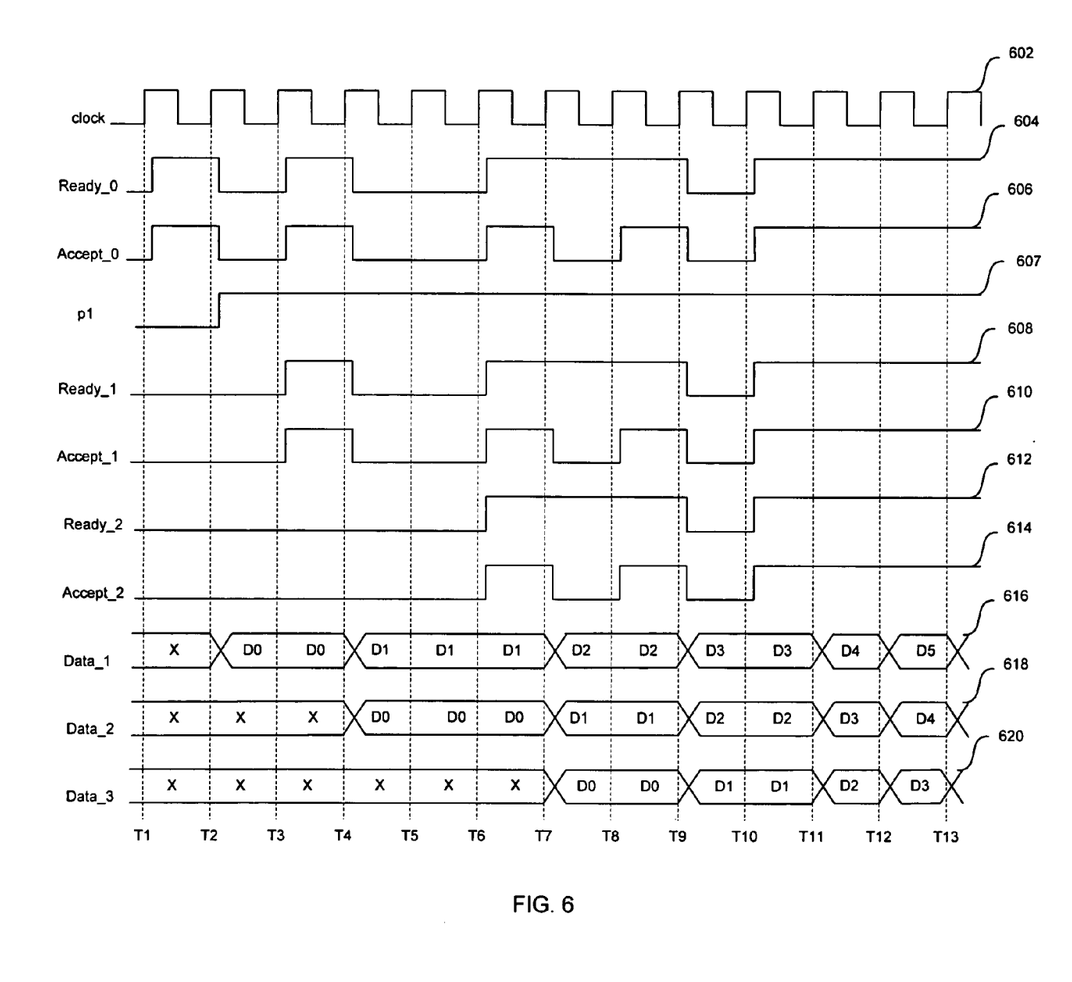
FIG. 6 is a timing diagram of a locked centralized reference control with common data buffer, in accordance with an embodiment of the invention.

FIG. 6 is a timing diagram of a locked centralized reference control with common data buffer, in accordance with an embodiment of the invention. Referring to FIG. 6, there is shown a clock signal 602, ready signals 604, 608, and 612, accept signals 606, 610, and 614, and data signals 616, 618, and 620. The data signals 616, 618, and 620 may be synchronously generated by the rising edge of the clock signal 602. The rising edges of the clock signal 602 may be shown by the time instants T1 . . . T13. The ready signals 604, 608, and 612 and the accept signals 606, 610, and 614 may be outputs of combinational logic circuits. There is also shown an output ready signal 607 of the pipeline stage 512 used to illustrate how an input ready signal, for example, the ready signal 608, may be generated by an AND gate. The ready signals 604 and 612 may be similarly generated via the AND gates 540 and 544, respectively.

The timing diagram of FIG. 6 illustrates data transfer in the first four pipeline stages, for example, the pipeline stages 510, 512, 514, and 516 of the pipeline described in FIG. 5. The pipeline stages 510, 512, 514, and 516 may be similar to the pipeline stage 310, 312, 314, and 316 (FIG. 3), and may generate output signals in the same way. However, the input ready signal to each of the pipeline stages 512, 514, and 516 may be outputs of the AND gates 540, 542, and 544, respectively. The inputs to the AND gates may be the input ready signal and output ready signal of each pipeline stage. For example, the output of the AND gate 542 may be the input ready signal to the pipeline stage 514 (ready signal 612). The inputs of the AND gate 542 may be the input ready signal to the pipeline stage 512 (ready signal 608) and the output ready signal 607 of the pipeline stage 512. The output accept signals, for example, the accept signals 606, 610, and 614, may be communicated directly to the preceding pipeline stage.

In operation, the ready signal 604 may be asserted at time instant T1 to indicate to the pipeline stage 512 that it may have new data D0. In response, the pipeline stage 512 may assert the accept signal 606, and the data D0 from the pipeline stage 510 may be stored in the pipeline stage 512 at time instant T2. Also at time instant T2, the ready signal 604 and the accept signal 606 may be deasserted. Additionally, the pipeline stage 512 may assert the output ready signal 607 to indicate to the pipeline stage 514 that it may have new data D0. However, since the ready signal 604 is not asserted, the output of the AND gate 542, the ready signal 608 may not be asserted. At time instant T3, the ready signal 604 may be asserted, and, therefore, the ready signal 608 may be asserted. In response, the pipeline stages 512 and 514 may assert the accept signals 606 and 610, respectively. The pipeline stages 512 and 514 may accept the data D1 and D0, respectively, from the pipeline stages 510 and 512, respectively, at time instant T3. At time instant T3, the ready signals 604 and 608, and the accept signals 606 and 610 may be deasserted. The output ready signal 607 may remain asserted until at least time instant T13.

The ready signals 604, 608, and 612 may be asserted at time instant T6 to indicate new data D2, D1, and D0, respectively. The pipeline stages 512, 514, and 516 may respond by asserting the accept signals 606, 610, and 614, respectively. At time instant T7, the pipeline stages 512, 514, and 516 may accept the new data D2, D1, and D0, respectively, from the pipeline stages 510, 512, and 514, respectively. Also at time instant T7, the pipeline stages 512, 514, and 516 may deassert the accept signals 606, 610, and 614, respectively.

At time instant T8, the pipeline stages 512, 514, and 516 may assert the accept signals 606. 610, and 614, respectively, in response to the still asserted ready signals 604, 608, and 612. At time instant T9, the pipeline stages 512, 514, and 516 may accept the data D3, D2, and D1, respectively. The ready signals 604, 608, and 612 and the accept signals 606. 610, and 614 may be deasserted at this time. At time instant T10, ready signals 604, 608, and 612 may be asserted and remain asserted at least until time instant T13, and the accept signals 606. 610, and 614 may be asserted in response by the pipeline stages 512, 514, and 516, respectively, and also remain asserted until at least time T13. At time instant T11, the pipeline stages 512, 514, and 516 may accept data D4, D3, and D2, respectively, and data D5, D4, and D3, respectively, at time instant T12. The pipeline stages 512, 514, and 516 did not lose locking of sequential data.

Figure 7:
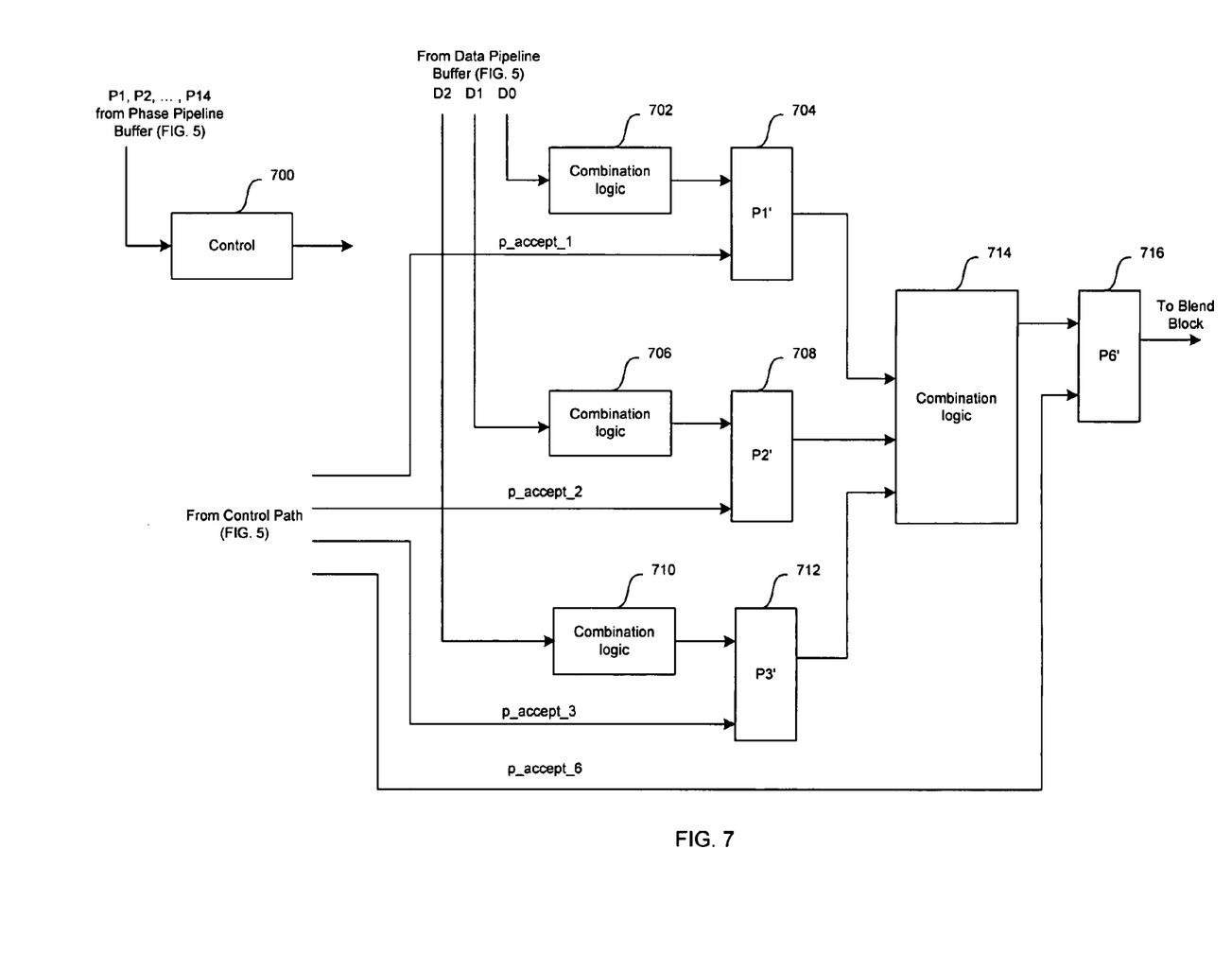
FIG. 7 is a block diagram illustrating exemplary processing of data from the centralized reference control with common data buffer, in accordance with an embodiment of the invention.

FIG. 7 is a block diagram illustrating exemplary processing of data from the centralized reference control with common data buffer, in accordance with an embodiment of the invention. Referring to FIG. 7, there is shown a control block 700, pixel processing blocks 702, 706, 710, and 714, and pixel storage blocks 704, 708, 712, and 716. The control block 700 may comprise suitable logic, circuitry and/or code that may be adapted to generate control signals that may be used, for example, in blending video data. The pixel processing blocks 702, 706, 710, and 714 may comprise suitable logic, circuitry and/or code that may be adapted to process pixels and generate a new pixel value. The pixel storage blocks 702, 706, 710, and 714 may comprise suitable logic, circuitry and/or code that may be adapted to store the new pixel value. For example, each of the pixel storage blocks 702, 706, 710, and 714 may be implemented using a register.

In operation, the pixel processing blocks 702, 706, 710, and 714 may have as inputs specific pixels from, for example, the common data buffer shown in FIG. 5. For example, the input of the pixel processing block 702 may be the pixel pixel_0 from the pipeline stage 510. Similarly, the inputs of the pixel processing blocks 706 and 710 may be the pixels pixel_1 and pixel_2 from the pipeline stages 512 and 514, respectively. The inputs of the pixel processing block 714 may be the outputs of the pixel storage blocks 704, 708, and 712. The pixel processing blocks 702, 706, and 710 may process the received pixels. However, the outputs of the pixel processing blocks 702, 706, and 710 may change as the input pixels change as they are shifted through the common buffer, for example, the data pipeline buffer 506 (FIG. 5). When the appropriate pixel accept signal, for example, p_accept_1, is asserted, the output of the pixel processing block 702 may be stored by the pixel storage block 704. Similarly, the assertion of the pixel accept signals p_accept_2, p_accept_3, and p_accept_6 may indicate that the outputs of the pixel processing blocks 706, 710, and 714, respectively, may be stored in the pixel storage blocks 708, 712, and 716, respectively.

In this manner, the pixel values stored in the pixel storage blocks 704, 708, 712 and 716 may be synchronized with the appropriate pixels shifted in to the pipeline stages. Accordingly, a blend block, for example, the blend block 210 or 214 (FIG. 2), may then blend the generated pixels with the appropriate pixels in the pipeline delay block 202 or 212, respectively (FIG. 2). A plurality of pixel accept signals, for example, p_accept_1, p_accept_2, p_accept_3, and p_accept_6, may be generally referred to as accept_n. Similarly, a group of pixels, for example, pixels pixel_0, pixel_1, and pixel_2, may be generally referred to as video_n. The various blocks may operate synchronously by utilizing a pre-determined clock signal or clock signals.

The control block 700 may generate control signals that may be communicated to blend blocks, for example, the blend blocks 210 and 214. The blend block 210 and 214 may use the control signals to select either the processed data from the processing block, for example, the data processing block 208 and 206, respectively, or the data from the pipeline delay block, for example, the pipeline delay block 202 and 212, respectively.

Figure 8:
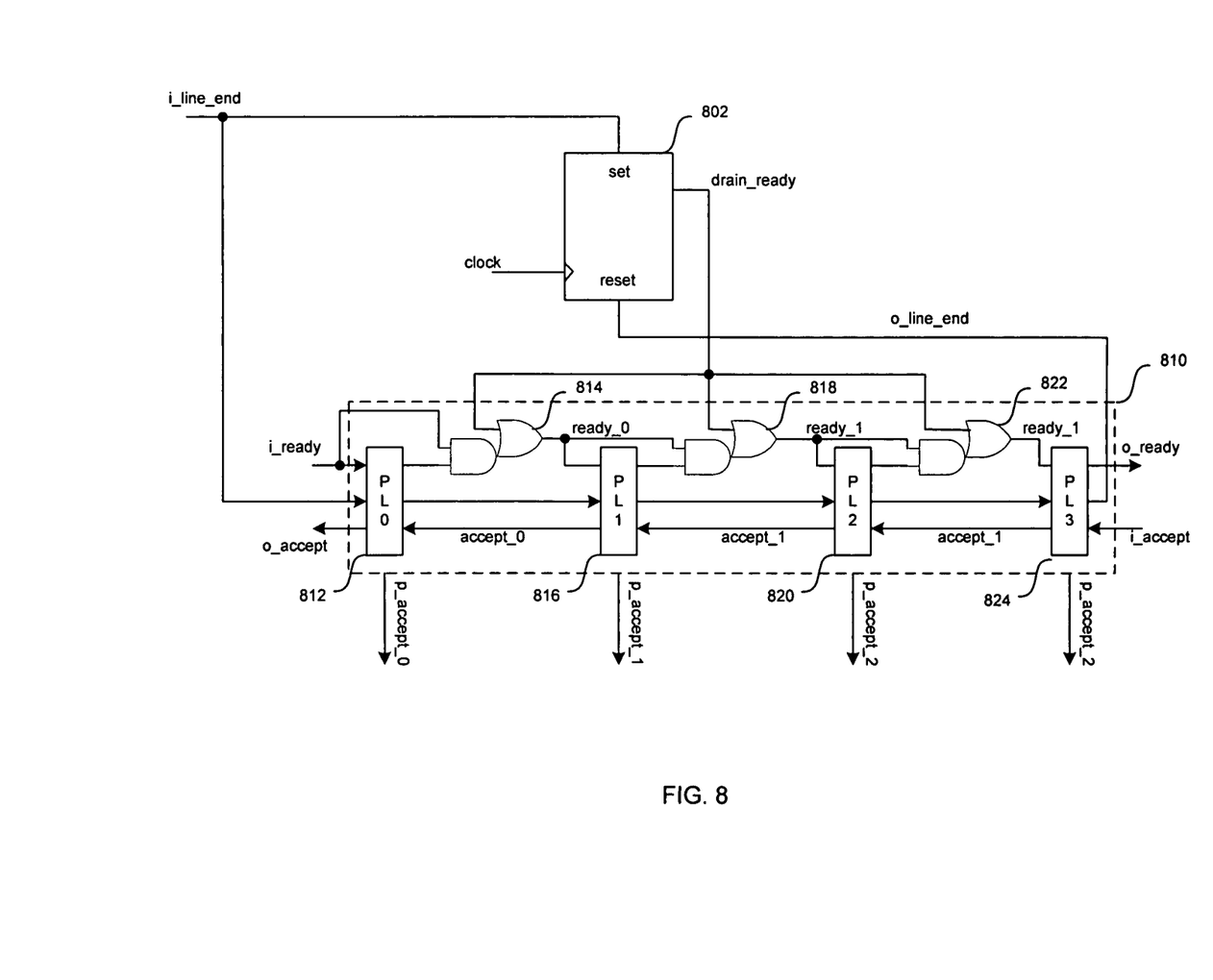
FIG. 8 is a block diagram illustrating exemplary drain control, in accordance with an embodiment of the invention.

FIG. 8 is a block diagram illustrating exemplary drain control, in accordance with an embodiment of the invention. Referring to FIG. 8, there is shown a bit storage register 802, and a four stage pipeline control path 810. The four stage pipeline control path 810 may comprise pipeline stages 812, 816, 820 and 824, and processing logic 814, 818, and 822. The ready inputs to the pipeline stages 816, 820, and 824 may be processed by the processing logic 814, 818, and 822, which may comprise, for example, an AND gate and an OR gate.

The bit storage register 802 may comprise suitable logic and/or circuitry that may be adapted to generate a draining signal (drain_ready) that may be asserted or deasserted by the input signals at a set input and a clear input, respectively. The draining signal (drain_ready) may be generated synchronously by using a clock signal. The draining signal (drain_ready) may be asserted by a video end of line signal (i_line_end) and may be deasserted by a delayed video end of line signal (o_line_end). Accordingly, the assertion and deassertion of the output signal drain_ready may be synchronous to the clock input. The pipeline stages 812, 816, 820, and 824 may be similar to the pipeline stages in FIGS. 3 and 5.

In operation, the draining signal (drain_ready) may be asserted by the video end of line signal (i_line_end) that may indicate the last pixel of a video line. The delayed video end of line signal (o_line_end) may be delayed by each of the pipeline stages in the control path, for example, the four stage pipeline control path 810. Accordingly, the output of the final pipeline stage, for example, the pipeline stage 824, may be the delayed video end of line signal (o_line_end) that may be synchronized with the last pixel of the video line. The video end of line signal (i_line_end) may be generated by suitable logic, circuitry and or code that may be adapted for such detection from video data, and may be, for example, in the VB receiver 102 (FIG. 1).

Figure 9:
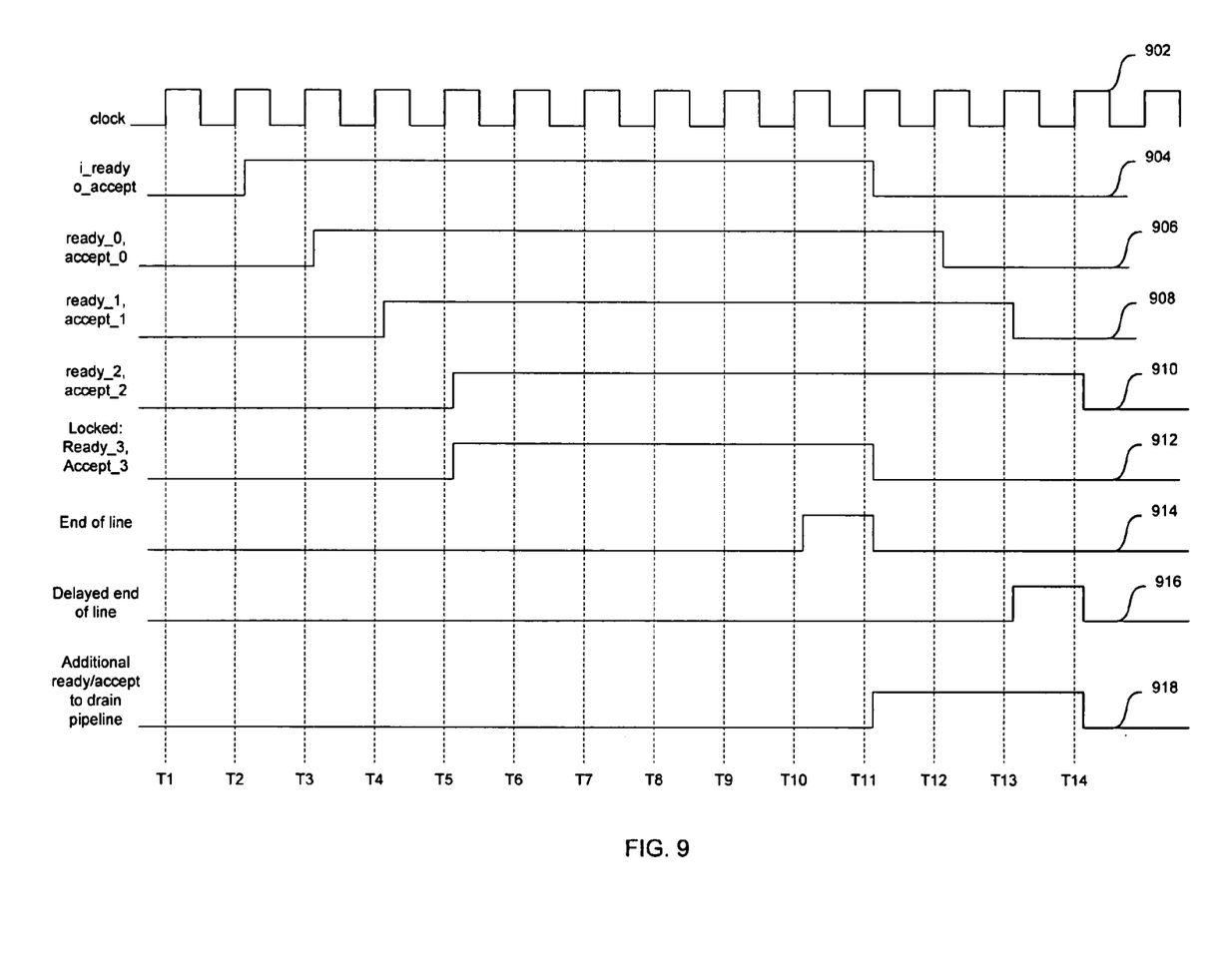
FIG. 9 is a timing diagram illustrating exemplary generation of a drain signal, in accordance with an embodiment of the invention.

FIG. 9 is a timing diagram illustrating exemplary generation of a drain signal, in accordance with an embodiment of the invention. Referring to FIG. 9, there is shown a clock signal 902, and synchronous actions may occur on the rising edges of the clocks signal 902. These edges may be indicated by the time instants T1 . . . T14. There is also shown waveforms 904, 906, 908, 910, and 912, and end of line signal 914, delayed end of line signal 916, and the drain signal 918.

The waveform 904 from time instant T2 to time instant T11 may represent, for example, a video line of pixels as an input to the first pipeline stage of a four stage pipeline. The waveform 906 from time instant T3 to time instant T12 may represent the input of the same video line to the second stage of the four stage pipeline, after propagating through the first pipeline stage. Similarly, the waveforms 908 and 910 may indicate the input of the same video line to third and fourth stages, respectively, of the four stage pipeline. The waveform 912 may indicate, for example, the video line input to the last stage if the four stage pipeline is utilizing a locked centralized reference control with common data buffer.

Since the input ready signals may be ANDed, as described in FIGS. 5 and 6, the effect may be that the last pixels in a video line input may not be clocked out of the synchronized pipeline. In order to provide a ready signal to drain these pixels from the synchronized pipeline, another signal may need to be generated. This signal may be the drain signal 918. The drain signal may be generated by utilizing an end of line signal 914. The end of line signal 914 may be generated by decoding the end of line information in the video data. The end of line signal 914 may be used to assert the drain signal 918, and the delayed end of line signal 916 may be used to deassert the drain signal. The delayed end of line signal 916 may be the end of line signal 914 that is propagated through the pipeline.

Figure 10:
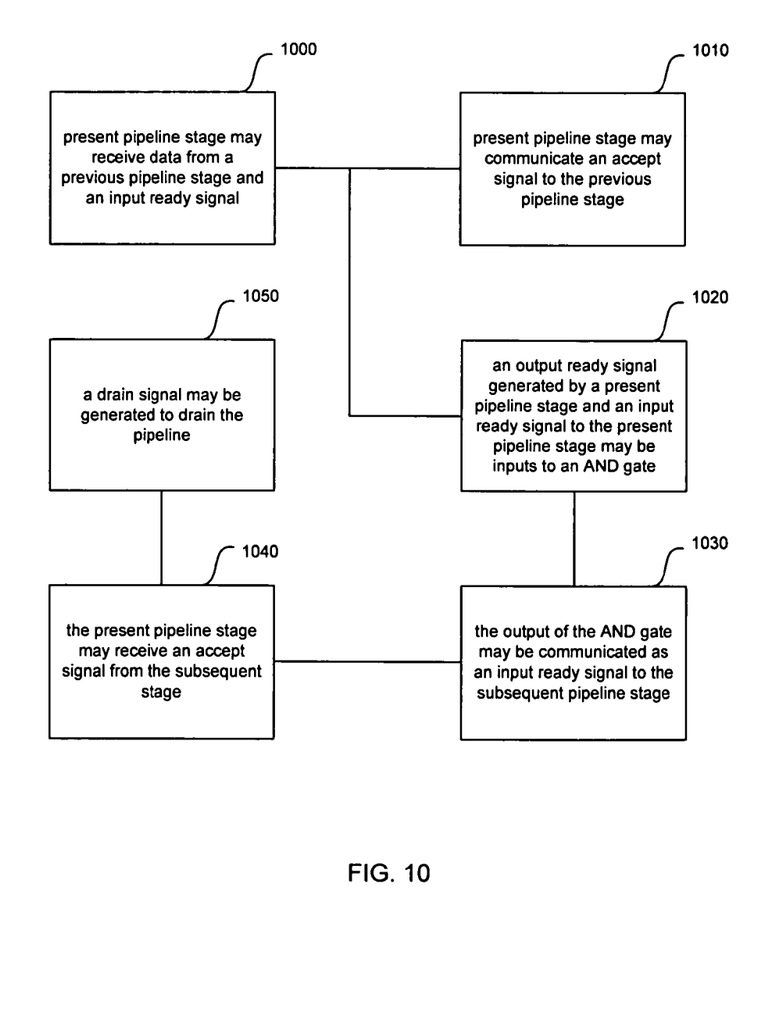
FIG. 10 illustrates an exemplary flow diagram implementing a locked buffer design, in accordance with an embodiment of the invention.

FIG. 10 illustrates an exemplary flow diagram implementing a locked buffer design, in accordance with an embodiment of the invention. Referring to FIG. 10, there is shown a plurality of steps 1000 to 1050 that may be utilized to synchronously control data transfer. In step 1000, a present pipeline stage may receive data from the previous pipeline stage. There may also be an input ready signal that may be an output of an AND gate, where the AND gate may have inputs that may be a ready signal generated by the previous pipeline stage and an input ready signal to the previous pipeline stage. In step 1010, the present pipeline stage may assert an accept signal to the previous pipeline stage if there is data for the subsequent pipeline stage in the present pipeline stage and the subsequent pipeline stage indicates acceptance of the data with an asserted accept signal. An accept signal may also be asserted by the present pipeline stage if the data has already been accepted by the subsequent pipeline stage.

In steps 1020, the present pipeline stage may generate an output ready signal and communicate that signal to the AND gate. The input ready signal to the present pipeline stage may also be communicated to an input of the AND gate. In step 1030, the output of the AND gate may be communicated as the ready signal to the subsequent pipeline stage. Since each pipeline stage may have a similar input ready signal, this may allow the pipeline stages to load new data at the same time. Consequently, this may allow each pipeline stage to load data from its respective previous pipeline stage at the same time. Accordingly, the data in the pipeline stages may be sequential. In step 1040, the present pipeline stage may receive an accept signal from the subsequent stage. This may allow the present stage to accept new data. In step 1050, the drain signal may be generated to drain the pipeline. This may be necessary since ANDing of the ready signals may result in some data being left in the pipeline, as described with respect to FIG. 9. The drain signal may be asserted using an end of line signal, and deasserted using the end of line signal that has been delayed by the pipeline stages.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data in a circuit, the method comprising:
    sequentially locking pipelining of data in a synchronized pipeline; and
    draining said synchronized pipeline of said data, wherein said draining is based on video end of line information in said data.

2. The method according to claim 1, comprising accepting said data synchronously at a substantially similar time by contiguous pipeline stages that have at least a portion of said data to be accepted.

3. The method according to claim 1, comprising generating a ready signal from a present pipeline stage of said synchronized pipeline to communicate to a subsequent pipeline stage of said synchronized pipeline.

4. The method according to claim 3, comprising processing said generated ready signal before communicating said processed generated ready signal to said subsequent pipeline stage of said synchronized pipeline.

5. The method according to claim 1, comprising communicating an accept signal from a present pipeline stage of said synchronized pipeline to a previous pipeline stage of said synchronized pipeline.

6. The method according to claim 1, comprising generating a drain signal for said draining.

7. The method according to claim 6, comprising asserting said drain signal based on said video end of line information in said data.

8. The method according to claim 6, comprising deasserting said drain signal based on said video end of line information in said data.

9. The method according to claim 1, comprising communicating data in said synchronized pipeline for processing to a plurality of data processing units.

10. The method according to claim 9, comprising blending said data processed by said data processing units and unprocessed data in said synchronized pipeline utilizing phase information in said data.

11. A system for processing data in a circuit, the system comprising:
    one or more circuits comprising a synchronized pipeline that is operable to sequentially lock pipelining of data, wherein said synchronized pipeline is operable to drain said data based on video end of line information in said data.

12. The system according to claim 11, wherein said one or more circuits are operable to accept said data synchronously at a substantially similar time by contiguous pipeline stages that have at least a portion of said data to be accepted.

13. The system according to claim 11, wherein a present pipeline stage of said synchronized pipeline is operable to generate a ready signal to communicate to a subsequent pipeline stage of said synchronized pipeline.

14. The system according to claim 13, wherein said one or more circuits are operable to process said generated ready signal before communicating said processed generated ready signal to said subsequent pipeline stage of said synchronized pipeline.

15. The system according to claim 11, wherein a present pipeline stage of said synchronized pipeline is operable to communicate an accept signal to a previous pipeline stage of said synchronized pipeline.

16. The system according to claim 11, wherein said one or more circuits are operable to generate a drain signal for said draining.

17. The system according to claim 16, wherein said drain signal is asserted based on said video end of line information in said data.

18. The system according to claim 16, wherein said drain signal is deasserted based on said video end of line information in said data.

19. The system according to claim 11, wherein said one or more circuits are operable to communicate data in said synchronized pipeline for processing to a plurality of data processing units.

20. The system according to claim 19, wherein said one or more circuits are operable to blend said data processed by said data processing units and unprocessed data in said synchronized pipeline utilizing phase information in said data.

* * * * *